(12) United States Patent
Tang et al.

(10) Patent No.: US 12,254,216 B2
(45) Date of Patent: Mar. 18, 2025

(54) STORAGE DEVICE AND DATA PROCESSING METHOD FOR CACHE READING DATA THEREOF

(71) Applicant: ZHONGSHAN LONGSYS ELECTRONICS CO., LTD., Zhongshan (CN)

(72) Inventors: Jiang Tang, Zhongshan (CN); Enhua Deng, Zhongshan (CN); Zhixiong Li, Zhongshan (CN)

(73) Assignee: ZHONGSHAN LONGSYS ELECTRONICS CO., LTD., Zhongshan (CN)

( * ) Notice: Subject to any disclaimer, the term of this patent is extended or adjusted under 35 U.S.C. 154(b) by 0 days.

(21) Appl. No.: 18/242,525

(22) Filed: Sep. 6, 2023

(65) Prior Publication Data

US 2023/0418522 A1 Dec. 28, 2023

Related U.S. Application Data

(63) Continuation of application No. PCT/CN2021/089259, filed on Apr. 23, 2021.

(30) Foreign Application Priority Data

Apr. 16, 2021 (CN) .......................... 202110412151.8

(51) Int. Cl.
G06F 3/06 (2006.01)

(52) U.S. Cl.
CPC .......... *G06F 3/0659* (2013.01); *G06F 3/0604* (2013.01); *G06F 3/0656* (2013.01); *G06F 3/0679* (2013.01)

(58) Field of Classification Search
CPC .... G06F 3/0659; G06F 3/0604; G06F 3/0656; G06F 3/0679; G06F 3/061; G06F 12/06;
(Continued)

(56) References Cited

U.S. PATENT DOCUMENTS

| 6,763,450 B1 * | 7/2004 | Miyaguchi | ............ G06F 9/3885 712/241 |
| 2006/0203548 A1 * | 9/2006 | You | ........................ G11C 16/26 365/185.12 |

(Continued)

FOREIGN PATENT DOCUMENTS

| CN | 109101444 A | 12/2018 |
| CN | 111124314 A | 5/2020 |

OTHER PUBLICATIONS

International Search Report,International Application No. PCT/CN2021/089259, mailed Jan. 20, 2022 (14 pages).

*Primary Examiner* — Tasnima Matin

(57) ABSTRACT

The present application discloses a storage device and a data processing method thereof. The method includes: receiving a data processing command; converting the data processing command into a plurality of groups of subcommands, wherein each group of subcommands includes at least one subcommand: caching each group of subcommands in a corresponding storage element: and submitting the subcommands in each storage element to a storage medium controller in sequence to execute the subcommands, wherein submitting, in response to at least two subcommands existing in the storage element, a data address of a subsequent subcommand and a previous subcommand simultaneously. By means of the described way, the data processing efficiency of the storage device may be improved.

18 Claims, 4 Drawing Sheets

(58) Field of Classification Search
CPC ...... G06F 13/16; G06F 3/0638; G06F 3/0658; G06F 12/0623
See application file for complete search history.

(56) References Cited

U.S. PATENT DOCUMENTS

| | | | | |
|---|---|---|---|---|
| 2011/0258424 | A1* | 10/2011 | Huang | G06F 9/4416 709/213 |
| 2015/0227458 | A1* | 8/2015 | Ide | G06F 12/0607 711/102 |
| 2016/0026486 | A1* | 1/2016 | Abdallah | G06F 9/30174 703/26 |
| 2018/0121220 | A1* | 5/2018 | Lei | G06F 9/455 |
| 2019/0095205 | A1 | 3/2019 | Zbiciak et al. | |
| 2020/0065107 | A1 | 2/2020 | Underwood et al. | |

* cited by examiner

STORAGE DEVICE AND DATA PROCESSING METHOD FOR CACHE READING DATA THEREOF

CROSS REFERENCE TO RELATED APPLICATION

The present application is a continuation of International Patent Application No. PCT/CN2021/089259, filed Apr. 23, 2021, which claims the priority of Chinese Patent Application No. 202110412151.8, filed Apr. 16, 2021, both of which are herein incorporated by reference in their entirety.

TECHNICAL FIELD

The present application relates to a technical field of data processing, in particular to a storage device and a data processing method.

BACKGROUND

A storage device is a critical part of a computer system and has been evolving rapidly over the years. For example, magnetic disks and magnetic tapes have always been main storage devices for computers. The magnetic disk is divided into two kinds, namely, the hard disk and the floppy disk. The hard disk has an access speed that is much greater than that of the floppy disk. The capacity of a hard disk employed in a microcomputer is up to dozens of gigabytes (GB). The capacity of a hard disk for a workstation has exceeded hundreds of GB. The storage technologies of optical disks have been commercialized in recent years. A general storage capacity of an optical disk is 650 MB. Another kind of erasable optical disk with application prosperity has also been launched on the market and is capable of accessing data at a higher data density.

When processing commands, each of the relevant storage devices has to finish the processing of one command before continuing the processing of a next command in a sequential order, resulting in poor data processing efficiency.

SUMMARY

The technical problem mainly solved by the present application is to provide a storage device and a data processing method thereof, so as to increase data processing efficiency of the storage device.

In order to solve the above-mentioned problem, one technical solution adopted in the present application is to provide a data processing method of a storage device. The method includes: receiving a data processing command; converting the data processing command into a plurality of groups of subcommands, wherein each group of subcommands includes at least one subcommand; caching each group of subcommands in a corresponding storage element; submitting the subcommands in each storage element to a storage medium controller in sequence to execute the subcommands; wherein, submitting, in response to at least two subcommands existing in the storage element, a previous subcommand and a data address of a subsequent subcommand at the same time.

In some embodiments, the converting the data processing command into the plurality of groups of subcommands includes: parsing the data processing command to obtain a plurality of subcommands; converting, based on a preset mapping table, the plurality of subcommands; and grouping, according to a storage element corresponding to each of the converted subcommand, the converted subcommands.

In some embodiments, the caching each group of subcommands in the corresponding storage element includes: caching each group of subcommands in a cache queue of a corresponding storage element; the submitting the subcommands in each storage element to the storage medium controller in sequence to execute the subcommands includes: submitting the subcommands in each cache queue to the storage medium controller in sequence to execute the subcommands.

In some embodiments, the submitting, in response to at least two subcommands existing in the storage element, the previous subcommand and the data address of the subsequent subcommand at the same time includes: obtaining, in response to at least two subcommands existing in the cache queue, a command type of the subsequent subcommand; in response to the command type of the subsequent subcommand being a read command, submitting the previous subcommand and the data address of the subsequent subcommand at the same time.

In some embodiments, the submitting the subcommands in each storage element to the storage medium controller in sequence to execute the subcommands includes: submitting the previous subcommand and the data address of the subsequent subcommand to the storage medium controller at the same time, such that the storage medium controller performs, while executing the previous subcommand, data reading based on the data address of the subsequent subcommand; and storing data read by the storage medium controller in a buffer.

In some embodiments, the performing data reading based on the data address of the later subcommand includes: determining whether target data corresponding to the data address exists in the buffer of the storage device; reading, in response to the target data corresponding to the data address existing in the buffer of the storage device, the target data; and reading, in response to the target data corresponding to the data address doing not exist in the buffer of the storage device, the target data corresponding to the data address from a storage area of the storage device.

In some embodiments, the converting, based on the preset mapping table, the plurality of subcommands; and grouping, according to the storage element corresponding to each of the converted subcommand, the converted subcommands includes: converting, based on the preset mapping table, a logical address of each of the plurality of subcommands to a physical address respectively; and grouping, according to the storage element corresponding to each physical address, the converted subcommands.

In some embodiments, the method further includes: in response to the command type of each of the at least two subcommands in the cache queue is the read command, the data addresses of the at least two subcommands are not consecutive.

In order to solve the above-mentioned problem, another technical solution adopted in the present application is to provide a storage device. The storage device includes a host controller, a memory and a storage medium controller. The memory and the storage medium controller are connected to the host controller. The memory is configured to store a program data. The host controller is configured to execute the program data, so as to implement the method provided in the above-mentioned technical solution.

In some embodiments, the storage device is any of a solid state hard disk, a USB flash drive, a Trans-flash (TF) Card or an Embedded Multi Media Card (eMMC) storage device.

The advantage of the present application is that, distinguished from the related art, the data processing method of the storage device in the present application includes: receiving the data processing command; converting the data processing command into a plurality of groups of subcommands, wherein each group of subcommands includes at least one subcommand; caching each group of subcommands in a corresponding storage element; submitting the subcommands in each storage element to the storage medium controller in sequence to execute the subcommands; wherein, submitting, in response to at least two subcommands existing in the storage element, the previous subcommand and the data address of the subsequent subcommand at the same time. With the above-mentioned technical solution, the previous subcommand and the data address of the subsequent subcommand are submitted at the same time, thereby enabling the storage device to preload the subsequent data while executing the previous subcommand. In this way, the processing time periods of two subcommands are overlapped, the processing time is reduced, and the data processing efficiency of the storage device may be increased.

BRIEF DESCRIPTION OF DRAWINGS

In order to more clearly illustrate technical solutions in the present application, the drawings required in the description of the embodiments will be briefly introduced below. Obviously, the drawings in the following description are only some embodiments of the present application. For those of ordinary skills in the art, other drawings could be obtained based on these drawings without creative efforts. Among the drawings.

DETAILED DESCRIPTION

Technical solutions in embodiments of the present application will be described clearly and thoroughly in connection with accompanying drawings of the embodiments of the present application. It should be appreciated that, the specific embodiments described herein are intended for explaining the present application only, and are not intended for limiting the present application. It should further be noted that, for ease of description, only part of, but not all of the structure relevant to the present application is illustrated in the accompanying drawings. All other embodiments by a person of ordinary skills in the art based on embodiments of the present application without creative efforts should all be within the protection scope of the present application.

The terms "first", "second" and the like in the present application are used for distinguishing between various items and not for describing a certain sequence. In addition, the terms "include", "comprise" and any variations thereof are intended to cover non-exclusive inclusion. For example, a process, a method, a system, a product, or a device that includes a series of operations or units is not limited to the listed operations or units, but optionally includes unlisted operations or units, or optionally also includes other operations or units inherent to these processes, methods, products or devices.

Reference to "embodiments" herein means that a specific feature, structure, or characteristic described in conjunction with the embodiments may be included in at least one embodiment of the present application. The appearance of this phrase in various locations in the specification does not necessarily refer to the same embodiment, nor is it an independent or alternative embodiment mutually exclusive with other embodiments. Those skilled in the art may explicitly and implicitly understand that, the embodiments described herein may be combined with other embodiments.

Figure 1:
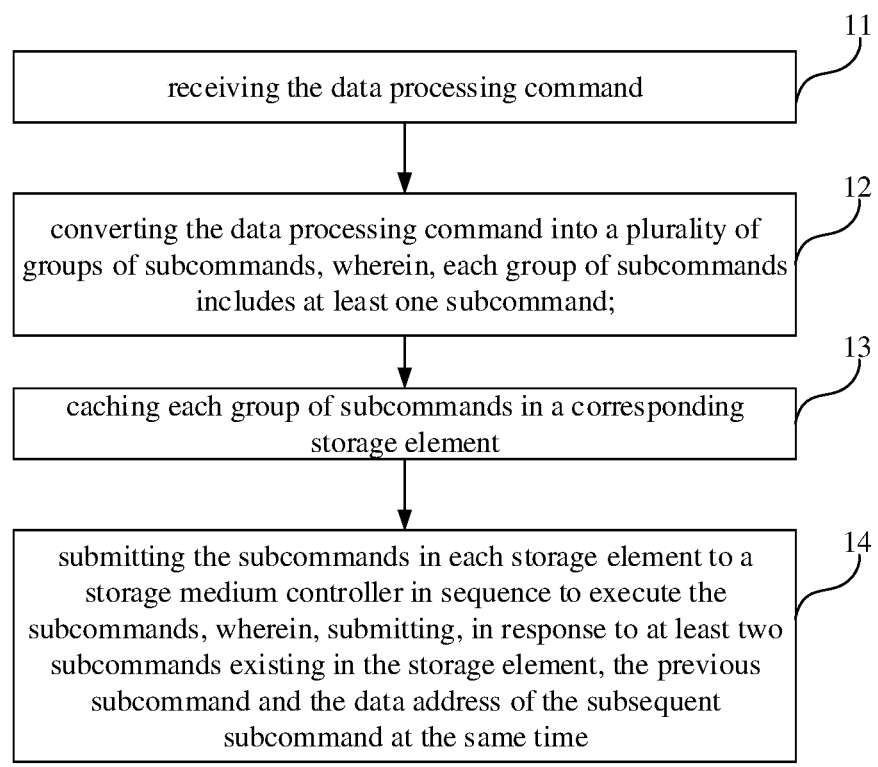
FIG. 1 is a schematic flowchart of a data processing method of a storage device according to an embodiment of the present application.

FIG. 1 is a schematic flowchart of a data processing method of a storage device according to an embodiment of the present application. The method includes operations at blocks illustrated in FIG. 1.

At block 11: receiving a data processing command.

In the present embodiment, the storage device is provided in an external device. For example, the external device may be a host computer, the storage device may be configured to interact with the host computer to implements operations such as data reading, data writing, or data erasing, etc. The storage device may be any one of a solid state hard disk, a USB flash drive, a TF card, or an eMMC storage device.

The data processing command may be a set including a series of commands such as reading, writing, and erasing etc. For example, the data processing command includes three reading commands, two writing commands and one erasing command.

At block 12: converting the data processing command into a plurality of groups of subcommands. In some embodiments, each group of subcommands includes at least one subcommand.

The storage device includes a plurality of storage elements. Each storage element is configured to store data. Therefore, each storage element corresponds to a data address. The subcommands belonging to the same storage element are divided into one group.

For example, the storage device includes four storage elements, namely A, B, C and D. The data processing command includes four reading commands (R1, R2, R3 and R4), two writing commands (W1 and W2) and one erasing command (S1). The ordering of the above-mentioned commands is R1-W1-R2-R3-W2-R4-S1. Upon conversion of the data processing command, the reading commands R1, R2, R3 and R4, the writing commands W1 and W2, and the erasing command S1 are obtained. A storage element corresponding to each of the commands is further obtained.

R1 corresponds to the storage element A. W1, R2 and R3 correspond to the storage element B. R4 corresponds to the storage element C. W2 and S1 correspond to the storage element D. Therefore, R1 constitutes a first group, W1, R2 and R3 constitute a second group, R4 constitutes a third group, and W2 and S1 constitute a fourth group.

At block 13: caching each group of subcommands in a corresponding storage element.

In the present embodiment, each subcommand in each group of subcommands may be cached, in accordance with their sequential order, in the corresponding storage element.

For example, if the data processing commands are sorted as R1-W1-R2-R3-W2-R4-S1, then when being cached, the W1, R2 and R3 are stored in an order of W1, R2 and R3.

For example, if the data processing commands are sorted as R1-W1-R2-R3-W2-R4-S1, then when being cached, the W1, R2 and R3 are stored in an order of R3, R2 and W1.

At block 14: submitting the subcommands in each storage element to the storage medium controller in sequence to execute the subcommands; in response to at least two subcommands being in the storage element, submitting a previous subcommand, and submitting a data address of a subsequent subcommand at the same time or simultaneously.

In some embodiments, each storage element corresponds to a storage medium controller, and the storage medium controller correspondingly processes the subcommands cached in the storage element.

For example, the above-mentioned storage element B corresponding to W1, R2 and R3 is taken as an example for illustration.

If in the storage element B, the subcommands are stored in the order of W1, R2 and R3, then the subcommands are submitted to the storage medium controller in the order of W1, R2 and R3, so as to enable the storage medium controller to execute corresponding subcommands. For example, when W1 is submitted, the data address of R2 is submitted at the same time or simultaneously. It should be appreciated that, when executing W1, the storage medium controller may feedback information to a host controller of the storage device upon completion of the execution of W1, and when the information is fed back, the execution of R2 may begin. Upon completion of the execution of R2, since R2 is a reading command, the data that has been read may be sent to the host controller of the storage device. At this point, the data address in R3 is handled synchronously to obtain the data corresponding to R3. In other words, the data stored at the data address in R3 is read.

If in the storage element B, the subcommands are stored in the order of R3, R2 and W1, then the subcommands are submitted to the storage medium controller in the order of W1, R2 and R3.

In the present embodiment, a method is provided, which includes: receiving a data processing command; converting the data processing command into a plurality of groups of subcommands, wherein each group of subcommands includes at least one subcommand; caching each group of subcommands in a corresponding storage element; submitting the subcommands in each storage element to the storage medium controller in sequence to execute the subcommands; wherein in response to at least two subcommands being in the storage element, submitting a previous subcommand, and submitting a data address of a subsequent subcommand at the same time. With the above-mentioned way, while a previous subcommand is submitted, the data address of a subsequent subcommand is submitted at the same time or simultaneously, thereby enabling the storage device to preload the following data while executing the previous subcommand. In this way, the processing time periods of two subcommands are overlapped, the processing time is reduced, and the data processing efficiency of the storage device may be increased.

Figure 2:
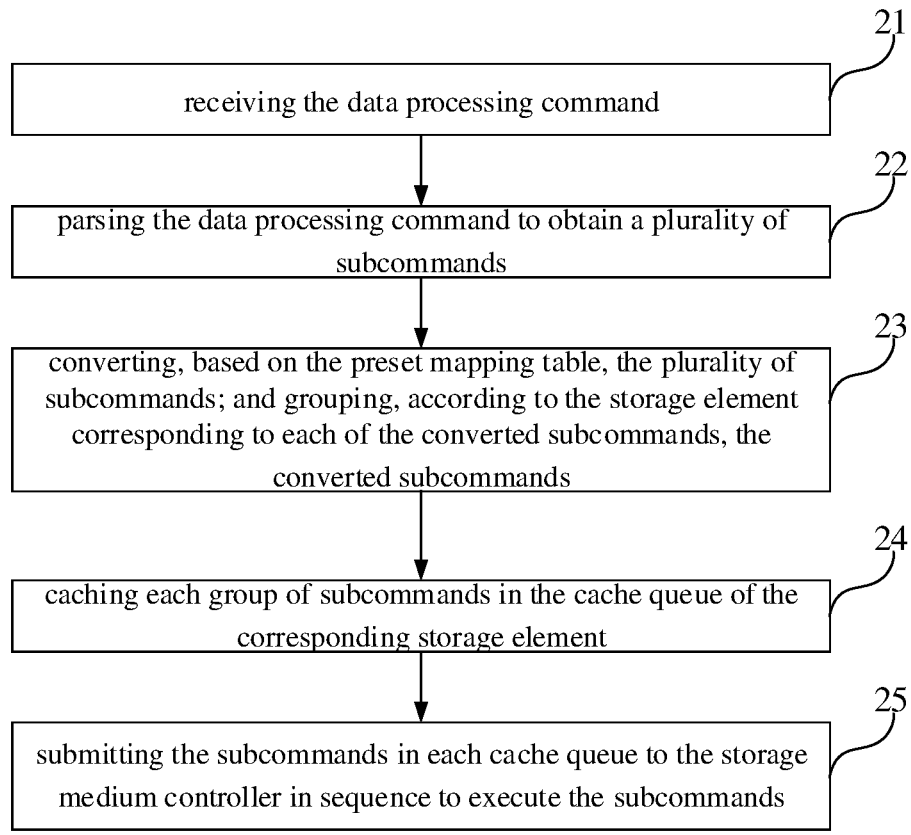
FIG. 2 is a schematic flowchart of a data processing method of a storage device according to another embodiment of the present application.

FIG. 2 is a schematic flowchart of a data processing method of the storage device according to another embodiment of the present application. The method includes operations at blocks illustrated in FIG. 2.

At block 21: receiving a data processing command.

At block 22: parsing the data processing command to obtain a plurality of subcommands.

The operation at blocks 21-22 have the same or similar technical solutions as the above-mentioned embodiments and would not be repeated herein.

At block 23: converting, based on a preset mapping table, the plurality of subcommands; and grouping, according to a storage element corresponding to each of the converted subcommand, the converted subcommands.

The correspondence between logical addresses and physical addresses is recorded in the preset mapping table. The logical address is the address of a memory cell, a storage element, or a network host in the computer architecture as viewed from the perspective of an application program. The physical address means that, in a storage device, information is stored in units of bytes or bits, for correct storage or access of the information, each byte or bit unit is assigned a unique storage address, known as the physical address, or an actual address or an absolute address.

Figure 3:
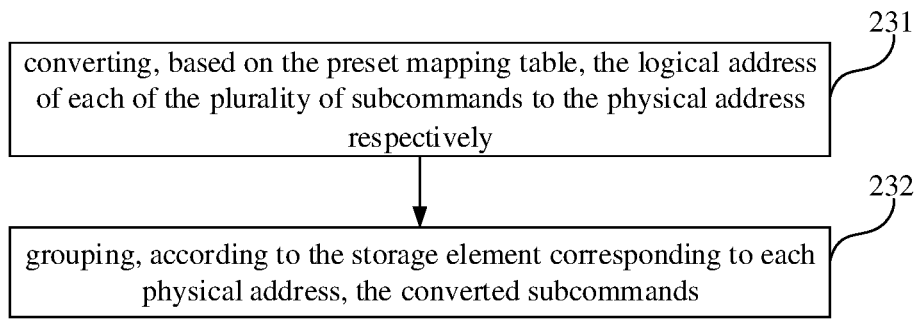
FIG. 3 is a schematic flowchart of an operation at a block 23 of FIG. 2 according to an embodiment of the present application.

In some embodiments, as illustrated in FIG. 3, the operation 23 may include operations at blocks illustrated in FIG. 3.

At block 231: converting, based on the preset mapping table, a logical address of each of the plurality of subcommands to a physical address respectively.

In some embodiments, if the data processing command includes a series of reading commands, then it should be appreciated that, in response to the plurality of reading commands being of random access type, the physical addresses of the plurality of reading commands may not be consecutive or not contiguous.

For example, taking a case in which the storage device is a Flash storage device as an example, the Flash storage device stores data in units of pages, and a plurality of pages form a storage element. For example, pages from a page 1 to a page 10 are included in the storage element. The logical address corresponding to one of the two adjacent reading commands is the page 1, and the logical address corresponding to the other of the two adjacent reading commands is a page 9.

At block 232: grouping, according to a storage element corresponding to each physical address, the converted subcommands.

Subcommands corresponding to physical addresses that belong to a same storage element are divided into one group.

At block 24: caching each group of subcommands in a cache queue of the storage element corresponding to the group.

In some embodiments, during an initializing process of the storage device, a cache queue is created for each storage element. The subcommands that are divided into one group are cached in the cache queue.

In some embodiments, the cache queue may be a First Input First Output (FIFO) queue. The subcommands stored in the FIFO queue are executed in a storage sequential order. During execution, the subcommand that is stored first is executed first.

At block 25: submitting the subcommands in each cache queue to the storage medium controller in sequence to execute the subcommands.

In response to the subcommand in the cache queue being a writing command, the storage medium controller writes the data in the writing command into the corresponding data address in the storage element.

In response to the subcommand in the cache queue being an erasing command, the storage medium controller erases, in accordance with the data address in the erasing command, the data corresponding to the data address in the storage element.

Figure 4:
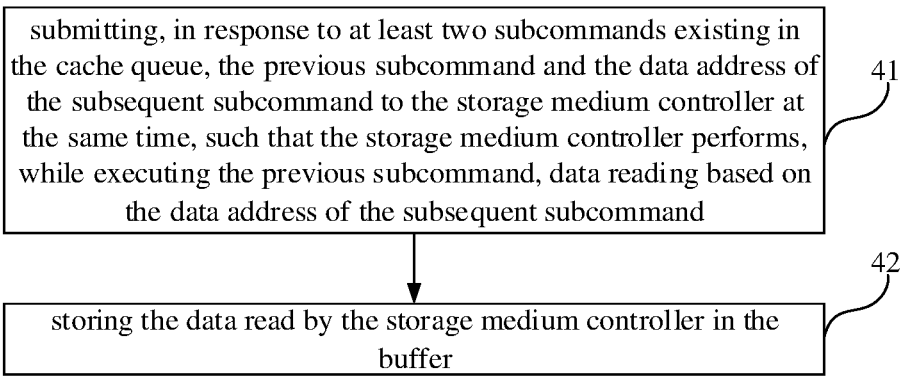
FIG. 4 is a schematic flowchart of an operation at a block 25 of FIG. 2 according to an embodiment of the present application.

In some embodiments, as illustrated in FIG. 4, the operation 25 may include operations at blocks illustrated in FIG. 4.

At block 41: in response to at least two subcommands existing in the cache queue, submitting the previous subcommand and the data address of the subsequent subcommand to the storage medium controller at the same time or simultaneously, such that the storage medium controller performs, while executing the previous subcommand, data reading based on the data address of the subsequent subcommand.

It should be appreciated that, the subsequent subcommand is a reading command. In this way, it is possible to execute the previous subcommand while accurately preloading the subsequent subcommand, thereby increasing a hit rate of a data reading operation and reading efficiency.

Figure 5:
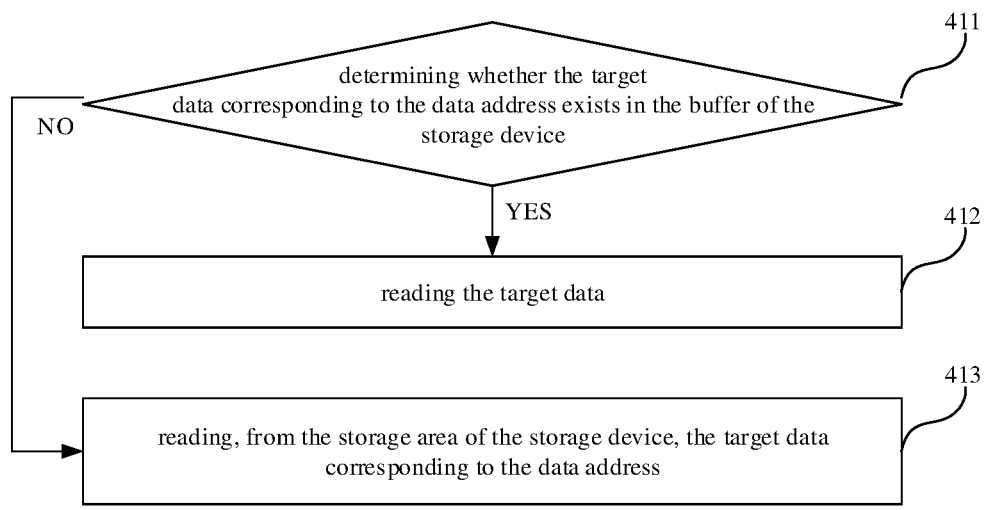
FIG. 5 is a schematic flowchart of an operation at a block 41 of FIG. 4 according to an embodiment of the present application.

In some embodiments, as illustrated in FIG. 5, the operation of data reading may include operations at blocks illustrated in FIG. 5.

At block 411: determining whether a target data corresponding to the data address exists in a buffer of the storage device.

In some embodiments, a piece of data that has been processed within a preset time period is stored in the buffer of the storage device. In this way, during the next reading operation, if the piece of data is stored in the buffer, then it is possible to read the piece of data directly in the buffer without performing an additional reading from the storage area, thereby increasing the reading efficiency.

In the operation at block 411, in response to determining that the target data corresponding to the data address exists in the buffer of the storage device, performing the operation at block 412. In response to determining that the target data corresponding to the data address does not exist in the buffer of the storage device, performing the operation at block 413.

At block 412: reading the target data.

If the target data corresponding to the data address exists in the buffer, then the target data is read directly from the buffer.

At block 413: reading, from a storage area of the storage device, the target data corresponding to the data address.

In the operation at block 413, the target data read at this time is stored in the buffer.

At block 42: storing the data read by the storage medium controller in the buffer.

The buffer may have been set at the time of performing conversion of the logical address as described above. In response to determining the existence of read commands in the data processing commands, a corresponding buffer is allocated for these read commands in order to perform the subsequent storage operation.

Figure 6:
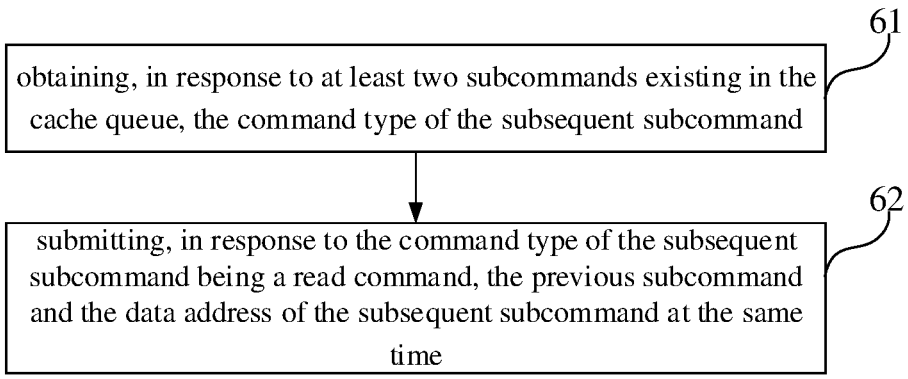
FIG. 6 is a schematic flowchart of an operation at a block 25 of FIG. 2 according to another embodiment of the present application.

In some embodiments, as illustrate in FIG. 6, the operation at the block 25 may include operations at blocks illustrated in FIG. 6.

At block 61: in response to at least two subcommands existing in the cache queue, obtaining the command type of the subsequent subcommand.

It should be appreciated that, there is a corresponding command identifier for each subcommand. During execution of the command, the command type of the subcommand is determined based on the command identifier.

At block 62: in response to the command type of the subsequent subcommand being the read command, submitting the previous subcommand and the data address of the subsequent subcommand at the same time.

In some embodiments, the storage device is provided with a reading-cache function. The purpose of the reading-cache function is to enable, at the same time when the host controller initiates data transmission, the storage medium controller to initiate loading of data required by the next host controller.

The storage medium controller performs data reading according to the submitted data address of the subsequent subcommand at the same time when the previous subcommand is completed.

In some embodiments, the operation of submitting the previous subcommand may refer to the submission of the command processing result by the host controller to the host computer side. For example, when the previous command is a read command, the host controller sends the data that has been read to the host computer side. In some embodiments, the operation of submitting the previous subcommand may refer to the submission of the command processing result by the storage medium controller to the host controller. For example, when the previous command is a read command, the storage medium controller sends the data that has been read to the host controller. The data address of the subsequent subcommand is submitted.

In some embodiments, when the command type of the subsequent subcommand is not the read command, the data address of the subsequent subcommand is submitted at the same time when the previous subcommand is submitted. Since the subcommand is not a read command, the storage media controller would not implement the reading-cache function.

The above-mentioned method may be applied to a random access scenario, in which when the command types of at least two subcommands in the cache queue are all read commands, the data addresses of the at least two subcommands are not consecutive. By the above-mentioned way, the problem of being unable to accelerate the process of random access is solved. The problem is due to the fact that, in the process of the random access, the execution of the subsequent read subcommand is possible only after the execution of each previous read subcommand has been completed. The above-mentioned method enables the storage device to accurately and precisely reading-cache the data of the subsequent subcommand required every time.

In an example application scenario where the storage device is a solid state hard disk, it should be appreciated that, the solid state hard disk adopts Flash dies as storage mediums. After the storage device is powered on and initialized, a FIFO structure is created for each Die of a Flash during the initialization process. Then a sequence of commands issued from the host computer side is parsed and converted into subcommands corresponding to the corresponding Dies on each physical channel of the Flash. These subcommands are cached, according to the channel in which they are located and the Chip Enables, into the corresponding FIFOs. The subcommands are then executed in the way of the above-mentioned embodiments. When the number of the subcommands of the FIFO is greater than or equal to 2, the subcommands will be submitted to the Flash controller for execution. While the current subcommand is submitted, the data address of the subsequent subcommand is obtained and submitted to the Flash controller along with the current subcommand. If the subsequent subcommand is the read command, the reading-cache function is executed. If the subsequent subcommand is not a read command, then the reading-cache function would not be initiated.

It should be appreciated that, when there is only one subcommand in the FIFO, the subcommand may be executed directly by the host controller.

With the above-mentioned way, while a previous subcommand is submitted, the data address of a subsequent subcommand is submitted at the same time, thereby enabling the storage device to preload the subsequent data while executing the previous subcommand. In this way, the processing time periods of two subcommands are overlapped, the processing time is reduced, and the data processing efficiency of the storage device may be increased. The problem of being unable to accelerate the process of random access is solved. The problem is due to the fact that, in the process of the random access, the execution of the subsequent read subcommand is possible only after the execution of each previous read subcommand has been completed. The above-mentioned method enables the storage device to accurately and precisely reading-cache the data of the subsequent subcommand required every time.

Figure 7:
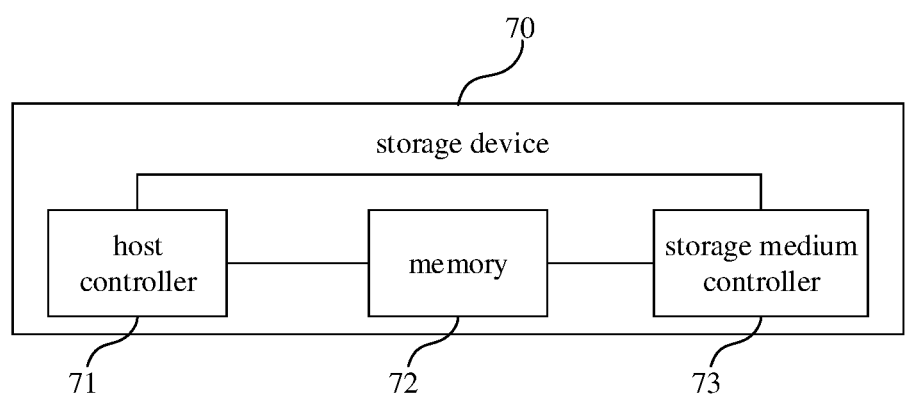
FIG. 7 is a schematic structural diagram of a storage device according to an embodiment of the present application.

As illustrated in FIG. 7, FIG. 7 is a schematic structural diagram of a storage device according to an embodiment of the present application. The storage device 70 includes a host controller 71, a memory 72 and a storage medium controller 73. The memory 72 and the storage medium controller 73 are connected to the host controller 71. The memory 72 is configured to store program data. The host controller 71 is configured to execute the program data, so as to implement the method. The method includes: receiving the data processing command; converting the data processing command into a plurality of groups of subcommands, wherein each group of subcommands includes at least one subcommand; caching each group of subcommands in a corresponding storage element; submitting the subcommands in each storage element to the storage medium controller in sequence to execute the subcommands; wherein in response to at least two subcommands existing in the storage element, submitting the previous subcommand and the data address of the subsequent subcommand at the same time.

It should be appreciated that, the host controller 71 in the present embodiment is further configured to execute the program data to implement the method in any of the above-mentioned embodiments. The specific implementation operations of the method may be referred to in the above-mentioned embodiments, and will not be elaborated herein.

In some embodiments, the memory 72 is partitioned into different areas. The memory 72 may be partitioned into a program data area and a read/write data area. The above-mentioned program data is stored in the program data area, while the data reading operation, writing operation, erasing operation, etc. in any of the above-mentioned embodiments are done in the read/write data area.

In some embodiments, the storage device 70 is a Flash storage device. Specifically, the storage device 70 may be a NAND-flash storage device or a NOR-flash storage device. Accordingly, the storage medium controller 73 may be a Flash controller.

In some embodiments, the storage medium controller 73 may be integrated into the host controller 71.

In some embodiments, the storage device 70 may also be any one of the solid state hard disk, the USB flash drive, the TF card, or the eMMC storage device. In any of the above-mentioned embodiments of the present application, while the previous subcommand is submitted, the data address of the subsequent subcommand is submitted at the same time, thereby enabling the storage device to preload the subsequent data while executing the previous subcommand. In this way, the processing time periods of two subcommands are overlapped, the processing time is reduced, and the data processing efficiency of the storage device may be increased. The problem of poor efficiency of random access in the solid state hard disk may also be solved.

In addition, the method of any of the above-mentioned embodiments may be applied in a test scenario of the storage device. Usually, when the storage device is tested, the read/write performance, such as sequential reading and random reading of the storage device will be repeatedly tested. By providing the method in the above-mentioned embodiments, the read/write performance may be improved, the testing time may be reduced, and the testing efficiency may be enhanced.

In the several embodiments provided in the present application, it should be appreciated that, the disclosed methods and devices may be implemented in other ways. For example, the device embodiments described above are merely illustrative. For example, division of modules or units is only a logical function division, and there may be other division manners in actual implementations. For example, multiple units or components may be combined or integrated into another system, or some features may be ignored or not implemented.

The units illustrated as separate components may or may not be physically separated, and the components illustrated as units may or may not be physical units. The units may be located in one place or may be distributed on multiple network units. Some or all of the units may be selected as per actual needs to fulfill the object of the present application.

In addition, each of the functional units in embodiments of the present application may be integrated into one processing unit, or may be physically separate units, or two or more units may be integrated into one unit. The above-mentioned integrated units may be implemented in the form of hardware or software functional units.

In the above-mentioned other embodiments, if the integrated units are implemented in the form of software functional units and sold or used as independent product, then they may be stored in a computer-readable storage medium. Based on such kind of appreciation, the technical solution of the present application essentially, or a part thereof contributing to the prior art, or part or all of the technical solution may be implemented in the form of a software product. The computer software product may be stored in a storage medium. The computer software product may include several instructions, which may enable a computer device (which may be a personal computer, a server, or a network device etc.) or a processor to implement all or a part of the operations of the method according to the various embodiments. The afore-mentioned storage medium may include: a U disk, a removable hard disk, a Read-Only Memory (ROM), a Random Access Memory (RAM), a magnetic disk or an optical disk and other media that is capable of storing program codes.

The above are only implementations of the present application, and do not limit the patent scope of the present application. Any equivalent structure variations or equivalent process variations made based on the description and drawings of the present application, or direct or indirect application of the present application in other related technical field are included in the protection scope of the present application.

What is claimed is:

1. A data processing method performed by a storage device, comprising:
   receiving a data processing command;
   converting the data processing command into a plurality of groups of subcommands, wherein, each group of subcommands comprises at least one subcommand;
   caching each group of subcommands in a corresponding storage element;
   submitting the subcommands in each storage element to a storage medium controller in sequence to execute the subcommands, and submitting, in response to at least two subcommands existing in the storage element, a previous subcommand and a data address of a subsequent subcommand simultaneously;
   wherein the caching each group of subcommands in the corresponding storage element comprises:
   caching each group of subcommands in a cache queue of a corresponding storage element;
   wherein the submitting, in response to at least two subcommands existing in the storage element, the previous subcommand and the data address of the subsequent subcommand simultaneously comprises:
   obtaining, in response to at least two subcommands existing in the cache queue, a command type of the subsequent subcommand;
   in response to the command type of the subsequent subcommand being a read command, submitting the previous subcommand and the data address of the subsequent subcommand simultaneously.

2. The method as claimed in claim 1, wherein
   the converting the data processing command into the plurality of groups of subcommands comprises:
   parsing the data processing command to obtain a plurality of subcommands;
   converting, based on a preset mapping table, the plurality of subcommands, and grouping, according to the storage element corresponding to each of the converted subcommands, the converted subcommands.

3. The method as claimed in claim 2, wherein
   the submitting the subcommands in each storage element to the storage medium controller in sequence to execute the subcommands comprises:
   submitting the subcommands in each cache queue to the storage medium controller in sequence to execute the subcommands.

4. The method as claimed in claim 3, wherein
   the cache queue is a First Input First Output queue.

5. The method as claimed in claim 1, wherein
   the submitting the subcommands in each storage element to the storage medium controller in sequence to execute the subcommands comprises:
   submitting the previous subcommand and the data address of the subsequent subcommand to the storage medium controller simultaneously, such that the storage medium controller performs, while executing the previous subcommand, data reading based on the data address of the subsequent subcommand; and
   storing data read by the storage medium controller in a buffer.

6. The method as claimed in claim 5, wherein
   the performing data reading based on the data address of the subsequent subcommand comprises:
   determining whether target data corresponding to the data address exists in the buffer of the storage device;
   reading, in response to the target data corresponding to the data address existing in the buffer of the storage device, the target data; and
   reading, in response to the target data corresponding to the data address not existing in the buffer of the storage device, the target data corresponding to the data address from a storage area of the storage device.

7. The method as claimed in claim 2, wherein
   the converting, based on the preset mapping table, the plurality of subcommands, and grouping, according to the storage element corresponding to each of the converted subcommands, the converted subcommands comprises:
   converting, based on the preset mapping table, a logical address of each of the plurality of subcommands to a physical address respectively; and
   grouping, according to the storage element corresponding to each physical address, the converted subcommands.

8. The method as claimed in claim 3, further comprising:
   in response to a command type of each of the at least two subcommands in the cache queue being a read command, the data addresses of the at least two subcommands are not consecutive.

9. A storage device, comprising a host controller, a memory and a storage medium controller, wherein, the memory and the storage medium controller are connected to the host controller,
   the memory is configured to store program data,
   the host controller is configured to execute the program data, so as to implement a data processing method comprising:
   receiving a data processing command;
   converting the data processing command into a plurality of groups of subcommands, wherein, each group of subcommands comprises at least one subcommand;
   caching each group of subcommands in a corresponding storage element; and
   submitting the subcommands in each storage element to a storage medium controller in sequence to execute the subcommands, and submitting, in response to at least two subcommands existing in the storage element, a previous subcommand and a data address of a subsequent subcommand simultaneously;
   wherein the caching each group of subcommands in the corresponding storage element comprises:
   caching each group of subcommands in a cache queue of a corresponding storage element;
   wherein the submitting, in response to at least two subcommands existing in the storage element, the previous subcommand and the data address of the subsequent subcommand simultaneously comprises:
   obtaining, in response to at least two subcommands existing in the cache queue, a command type of the subsequent subcommand;
   in response to the command type of the subsequent subcommand being a read command, submitting the previous subcommand and the data address of the subsequent subcommand simultaneously.

10. The storage device as claimed in claim 9, wherein
    the converting the data processing command into the plurality of groups of subcommands comprises:
    parsing the data processing command to obtain a plurality of subcommands;
    converting, based on a preset mapping table, the plurality of subcommands, and grouping, according to a storage element corresponding to each of the converted subcommands, the converted subcommands.

11. The storage device as claimed in claim 10, wherein the submitting the subcommands in each storage element to the storage medium controller in sequence to execute the subcommands comprises:
submitting the subcommands in each cache queue to the storage medium controller in sequence to execute the subcommands.

12. The storage device as claimed in claim 11, wherein the cache queue is a First Input First Output queue.

13. The storage device as claimed in claim 9, wherein the submitting the subcommands in each storage element to the storage medium controller in sequence to execute the subcommands comprises:
submitting the previous subcommand and the data address of the subsequent subcommand to the storage medium controller simultaneously, such that the storage medium controller performs, while executing the previous subcommand, data reading based on the data address of the subsequent subcommand; and
storing data read by the storage medium controller in a buffer.

14. The storage device as claimed in claim 13, wherein the performing data reading based on the data address of the subsequent subcommand comprises:
determining whether target data corresponding to the data address exists in the buffer of the storage device;
reading, in response to the target data corresponding to the data address existing in the buffer of the storage device, the target data; and
reading, in response to the target data corresponding to the data address doing not exist in the buffer of the storage device, the target data corresponding to the data address from a storage area of the storage device.

15. The storage device as claimed in claim 10, wherein the converting, based on the preset mapping table, the plurality of subcommands, and grouping, according to the storage element corresponding to each of the converted subcommands, the converted subcommands comprises:
converting, based on the preset mapping table, a logical address of each of the plurality of subcommands to a physical address respectively; and
grouping, according to the storage element corresponding to each physical address, the converted subcommands.

16. The storage device as claimed in claim 11, further comprising:
in response to a command type of each of the at least two subcommands in the cache queue being a read command, the data addresses of the at least two subcommands are not consecutive.

17. The storage device as claimed in claim 9, wherein the storage device is any of a solid state hard disk, a USB flash drive, a Trans-flash Card or an eMMC storage device.

18. The storage device as claimed in claim 9, wherein the storage device is a Flash storage device, and the storage medium controller is a Flash controller.

* * * * *